United States Patent [19]

Tzannes et al.

[11] Patent Number: 5,497,398

[45] Date of Patent: Mar. 5, 1996

[54] MULTI-CARRIER TRANSCEIVER

[75] Inventors: Michael A. Tzannes, Newton; Marcos C. Tzannes, Watertown, both of Mass.

[73] Assignee: Aware, Inc., Cambridge, Mass.

[21] Appl. No.: 105,796

[22] Filed: Aug. 12, 1993

[51] Int. Cl.[6] .............................. H04K 1/10; H04L 27/28; H04L 5/12
[52] U.S. Cl. .................... 375/260; 375/261; 375/262
[58] Field of Search ........................................ 375/38, 39

[56] References Cited

U.S. PATENT DOCUMENTS 5,128,964  7/1992  Mallory ..................................... 375/39

OTHER PUBLICATIONS

John A. C. Bingham, *Multicarrier Modulation for Data Transmission: An Idea Whose Time Has Come*, IEEE Communications Magazine, pp. 5–14 (May 1990).

John M. Cioffi, *A Multicarrier Primer*, Amati Communications Corporation and Stanford University.

*Primary Examiner*—Sandra L. O'Shea
*Assistant Examiner*—John Ning
*Attorney, Agent, or Firm*—Calvin B. Ward

[57] ABSTRACT

A multi-carrier data transmission system utilizing lapped transforms. Information to be transmitted is divided into a plurality of channels that are coded using a transform that places information into narrow bandwidth channels. The system makes use of the superior properties of filter banks constructed with narrow-band lapped transforms to provide improved signal isolation between the data channels. A new form of lapped transformation that provides both narrow-band filtering and phase information is described. The transform utilizes two components to provide information on phase changes induced by errors on the communication link. The improved transform provides a means for correcting for phase shifts that occur on the communication link. The system has superior burst noise immunity compared to systems based on FFT's.

6 Claims, 2 Drawing Sheets

5,497,398

MULTI-CARRIER TRANSCEIVER

FIELD OF THE INVENTION

The present invention relates to digital signal transmission systems, and more particularly, to a system for maximizing the amount of data that can be transmitted over a channel having a signal-to-noise ratio that varies with frequency.

BACKGROUND OF THE INVENTION

The present invention may be more easily understood with reference to a telecommunication system in which individual subscribers are connected to a central office by metallic conductors having a limited frequency response. However, it will be apparent to those skilled in the art that the invention may be utilized in numerous other communication situations. The attenuation of the metallic conductors increases with frequency. This increase limits the data rates using conventional digital transmission techniques to about 64 Kbps. While this level is sufficient for conventional voice traffic and some data transmission needs, it would be advantageous to increase the throughput. For example, video applications require data rates in excess of 1 Mbps.

One method for increasing the throughput of such a data channel is to divide the bandwidth of the channel into a number of adjacent frequency bands. Each band is used to send a portion of the digital data. Those bands having the higher signal to noise ratios are used to transmit more bits than channels having smaller signal to noise ratios.

Consider one such frequency band. It will be assumed that the attenuation of the conductor at this frequency is essentially constant over the frequency band in question and that the noise levels in the frequency band are constant over time. Data is to be transmitted on this frequency band as "symbols" having some predetermined number of states. The maximum number of states will be determined by the signal to noise ratio in the frequency band. For example, assume that the maximum signal that can be sent to the receiver on the channel is 8 volts and the noise level in the channel is 0.5 volts. Then symbols having 8 states can be sent down the channel and correctly decoded. Hence, this channel can be used to send 3 bits on each transmission cycle.

Channel attenuation reduces the signal to noise ratio. There is always some maximum signal power that can be applied at the input side of the channel. A signal entering the input side of the channel will be reduced by the attenuation factor when it is received at the output side of the channel. However, the noise level on the channel is essentially independent of the attenuation. Hence, channels having higher attenuation will have lower signal to noise ratios. As a result, fewer bits can be sent on the higher attenuation channel.

If the channel attenuation is known and the noise levels remain constant, data symbols having the maximum number of states can be selected. In general, there are two sources of noise. The first source is relatively constant in time and depends on the environment in which the conductors are situated. The second source of noise is cross-talk between adjacent channels and conductors in cable over which the signals are being sent. In general, this noise source will change rapidly in time and will depend on the information being sent in the adjacent channels.

In prior art digital multi-carrier systems, the division of the channel into sub-bands is accomplished by utilizing a finite Fourier transform (FFT). Assume the channel is to be broken into M sub-channels. Each sub-channel is allocated part of the data. Denote the data value to be sent in the $i^{th}$ sub-channel by $S_i$. Then, the data is processed by taking the FFT of the vector whose components are the $S_i$. The resultant block of M inverse Fourier transform values is then sent on the channel. At the receiving end of the channel, the received values are transformed using the inverse FFT to recover the $S_i$.

While this approach significantly improves the rate of data transmission on the channel, it is far from optimum. First, the FFT method for breaking the channel into sub-channels provides filters that have significant side-lobes. As noted above, side-lobes increase the noise in the channel and thereby limit the amount of data that can be sent in a sub-band.

In addition, burst noise can affect a significant number of data bits in this type of transmission system. In principle, each of the FFT transform values in a block is used in computing each of the $S_i$. Hence, if one of the values is destroyed by a noise burst, the entire set of M symbols can be lost.

Broadly, it is the object of the present invention to provide an improved multi-carrier data transmission system.

It is a further object of the present invention to provide a multi-carrier transmission system having filters with reduced side-lobes relative to those obtained with FFT based systems.

It is a still further object of the present invention to provide a multi-carrier transmission system which ameliorates the effects of burst noise.

These and other objects of the present invention will become apparent to those skilled in the art from the following detailed description of the invention and the accompanying drawings.

SUMMARY OF THE INVENTION

The present invention is a system for communicating information over a communication link having attenuation and phase shifting characteristics that vary with frequency. The information to be sent is coded as a plurality of digital symbols. Each symbol may take on one of a plurality of states. The number of states will, in general, be different for different symbols. The symbols are processed in groups of M symbols. Upon receiving each new group of M symbols, the system generates a set of M time-domain samples. This is accomplished by computing the correlation of the most recently received W symbols with each of a set of M vectors, each vector having W components. The time-domain samples are then converted to analog signals for transmission on the communication link. At the receiving end of the communication link, the analog signals are digitized. The digitized time-domain signals are processed in groups of M symbols to generate a set of M modified data symbols. The receiving portion of the system stores the last W time-domain signals received. The modified data symbols are generated by computing the correlation of the last W time-domain signals with each of a set of M vectors. The M vectors, $^iC$, for i=1 to M are related to the vectors used to generate the time-domain signals. In the preferred embodiment of the present invention, $$^iC = {}^iA + j{}^i\hat{A},$$

where, $^i\hat{A}_k = {}^iA_{W-k}$ for k=0 … W−1 and j=$\sqrt{-1}$. The modified data symbols are then corrected for the attenuation and phase shifts introduced by the communication link.

DETAILED DESCRIPTION OF THE INVENTION

Figure 1:
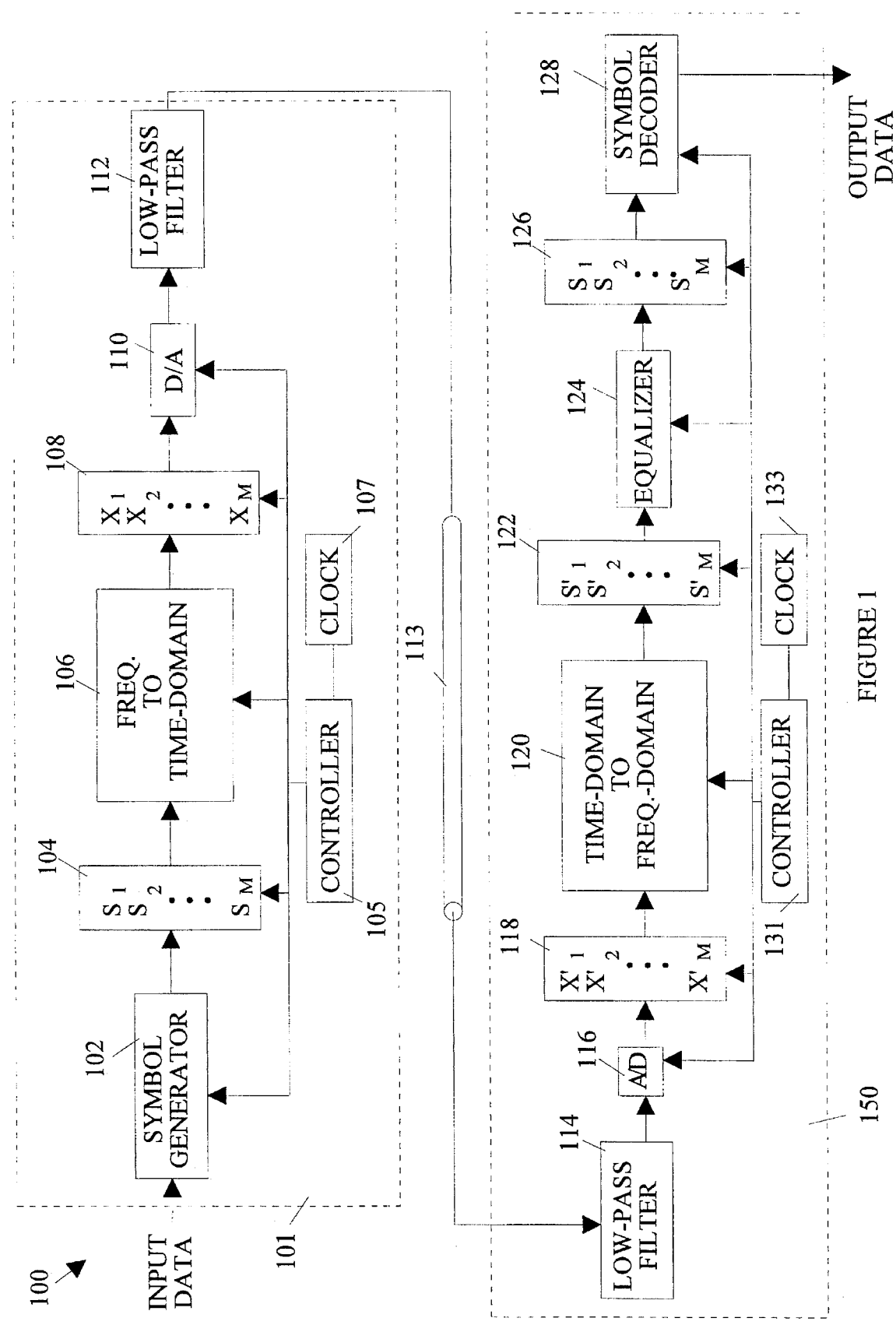
FIG. 1 is a block diagram of a communication system according to the present invention.

The manner in which the present invention operates can be more easily understood with reference to FIG. 1 which is a block diagram of a multi-carrier transceiver according to the present invention. Transceiver 100 includes a transmitter 101 that codes data for transmission on a communication link 113, and a receiver 150 which decodes data transmitted on communication link 113. The transmitter section of one transceiver and the receiving section of a second transceiver are shown in FIG. 1. The input data stream is received by a symbol generator 102. When controller 105 determines that N bits have been received by symbol generator 102, controller 105 causes symbol generator 102 to convert the run of data bits into M symbols $S_1, S_2, \ldots, S_M$ which are stored in a register 104. The number of possible states for each symbol will depend on the characteristics of the transmission channel 113. For example, the maximum number of states for a particular channel may be set to the maximum signal amplitude that can be transmitted in the channel divided by the amplitude of the noise in the channel or some value proportional to the noise amplitude. For the purposes of the present discussion, it is sufficient to note that each symbol is a number that may vary from 0 to some predetermined upper bound and that the run of data bits is much greater than M.

Transceiver 100 treats the symbols $S_i$ as if they were the amplitude of a signal in a narrow frequency band. It is assumed that the phase of each signal is zero when the signal enters communication link 113. Frequency to time-domain transform circuit 106 generates a time domain signal having values $x_i$. This time-domain signal has the frequency components $S_i$ over the time period represented by the M samples $x_i$. The time domain signals are stored in a shift register 108. The contents of shift register 108 represent, in digital form, the next segment of the signal that is to be actually transmitted over communication link 113. The actual transmission is accomplished by clocking the digital values onto communication link 113 after converting the values to analog voltages using D/A converter 110. Clock 107 provides the timing pulses for the operation. The output of D/A converter 110 is low-pass filtered by filter 112 before being placed on communication link 113.

At the receiving end of communication link 113, the $S_i$ are recovered by reversing the coding process and correcting for losses in communication link 113. The signals received on communication link 113 are low-pass filtered to reduce the effects of out-of-band noise. Controller 131 causes the signals to be digitized and shifted into a register 118. This is preferably accomplished with the aid of a clock 133 which is synchronized to clock 107. When M values have been shifted into register 118, the contents thereof are converted via a time-domain to frequency-domain transform circuit 120 to generate a set of frequency domain symbols $S'_i$. This transformation is the inverse of the transformation generated by frequency to time-domain transform 106. It should be noted that communication link 113 will in general both attenuate and phase shift the signal represented by the $X_i$. Hence, the signal values received at low-pass filter 114 and A/D converter 116 will differ from the original signal values. That is, the contents of shift register 118 will not match the corresponding values from shift register 108. For this reason, the contents of shift register 118 are denoted by $X'_i$. Similarly, the output of the time to frequency-domain transform will also differ from the original symbols $S_i$; hence, the contents of register 122 are denoted by $S'_i$. Equalizer 124 corrects the $S'_i$ for the attenuation and phase shift resulting from transmission over communication link 113 to recover the original symbols which are stored in buffer 126. The manner in which this is accomplished will be explained in more detail below. Finally, the contents of buffer 126 are decoded to regenerate the original data stream by symbol decoder 128.

In prior art transceivers of this type, the time-domain to frequency-domain transforms and the inverse transforms are implemented as FFT's. While the Fourier transform does provide a decomposition into frequency bands, the equivalent filters are less than optimum for the present purposes. For example, the individual filter response curves have mainlobes that intersect at −3 dB and side-lobes at −13 dB. As a result, there is significant mixing of information between adjacent frequency bands. As noted above, this results in an increase in the noise levels.

Filter banks with more optimal response curves are known to the art. In particular there are classes of perfect, or near perfect, reconstruction filter banks which generate a set of decimated sub-band outputs from a segment of a time domain signal. Each decimated sub-band output represents the signal amplitude in a predetermined frequency range. The inverse operation is carried out by a synthesis filter bank which accepts a set of decimated sub-band outputs and generates therefrom a segment of the time domain signal. If the analysis and synthesis operations are carried out with sufficient precision, the segment of the time domain signal generated by the synthesis filter bank will match the original segment of time domain signal that was inputted to the analysis filter bank. The differences between the reconstructed signal and the signal can be made arbitrarily small.

The frequency response curves of these filter banks are much better suited to the purposes of the present invention than the FFT frequency response curves. For example, an equivalent frequency bank which has mainlobes that do not intersect and side-lobes at −23 dB may be constructed for an M=16.

Figure 2:
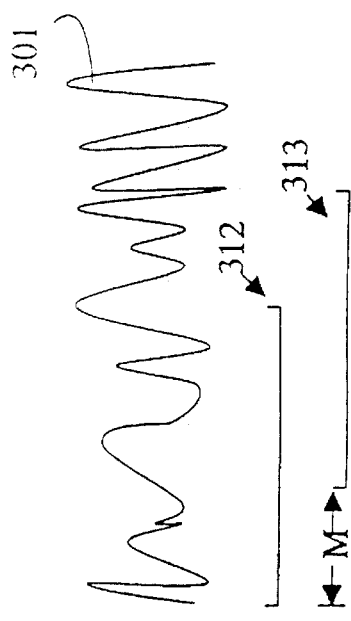
FIG. 2 illustrates the grouping of blocks of symbols in an overlapped transform according to the present invention.

In addition, these filter banks utilize an "overlapped" transformation that provides additional protection against burst noise. The nature of the overlap may be more easily understood with reference to the inverse filter, i.e., transform circuit 120, that converts a sequence of time-domain samples to a set of frequency components. This filter will be referred to as an analysis filter in the following discussion. The analysis filter utilizes overlapping segments to generate successive frequency component amplitudes. The relationship of the segments is shown in FIG. 2 for a signal 301. The sub-band analysis filter generates M frequency components for signal 301 for each M signal values. However, each frequency component is generated over a segment having a duration much greater than M. Each component is generated over a segment having a length of W sample values, where W>M. Typical segments are shown at 312 and 313. It should be noted that successive segments overlap by (W−M) samples. The quantity W/M will be referred to as the genus of the transformation in the following discussion. In general, the genus of the transformation is an integer that is greater than or equal to one.

Figure 3:
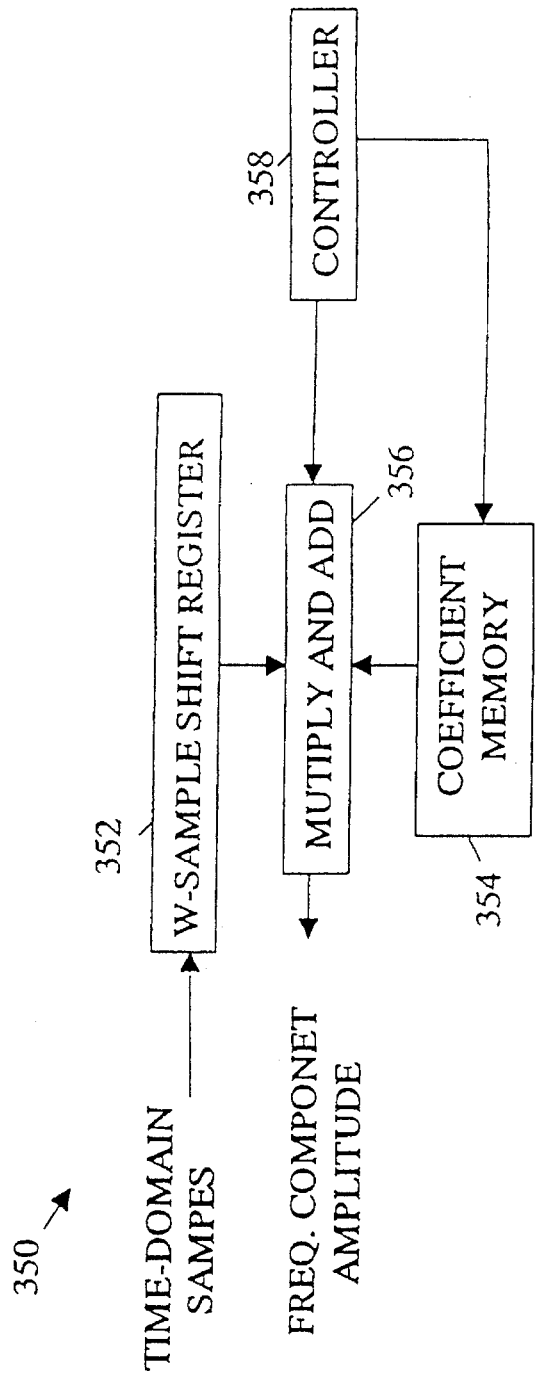
FIGS. 3 is a block diagram of a transform circuit according to the present invention.

The transform circuit is equivalent to a bank of finite impulse response filters. A block diagram for one such filter is shown in FIG. 3 at 350. The time domain samples are shifted into a W-sample shift register 352. Each time M new samples are shifted into shift register 352, the oldest M samples in the shift register are lost. Controller 358 then computes the weighted sum of the sample values stored in shift register 352. The weighted sum is the amplitude of the time-domain signal in the filter band represented by the weights which are stored in memory 354. For the purposes of this discussion, denote the weights used to compute the $i^{th}$ frequency component, $F_i$, by $^iA_k$, where k runs from 0 to W−1. Controller 358 cause multiply and add circuit 356 to generate the $F_i$ according to the following equation $$F_i = \sum_{k=0}^{W-1} {}^iA_k * X_k \qquad (1)$$

where the $X_k$ are the contents of shift register 352. It will be apparent from Eq. (1) that $F_i$ is the correlation between the contents of the shift register and the $i^{th}$ set of filter coefficients. The transform circuit generates M such frequency components using the different weight sets for each frequency component.

Eq. (1) represents the operations carried out by transform circuit 120. As noted above, the overlapped transforms provide improved side-lobes compared to FFTs. They also provide increased protection to burst noise compared to FFTs. FFT's utilize sums with only M weights. Hence, the contribution of each time domain sample to the final frequency component is greater. If one sample is in error, the sample can cause all of the frequency components in a block to be in error. In contrast, the filter banks described by Eq. (1) place less emphasis on the individual time domain samples since the sum is carried out over a much greater number of time domain samples. Hence, an error in one sample is less likely to cause errors in the frequency components.

The time domain samples are computed from a set of frequency components by a similar transformation. The same basic apparatus shown in FIG. 3 can also be used for the inverse transformation. That is, given M new frequency components, $F_i$, for i=0 to M−1, a set of M time domain samples, $X_i$, for i=1, ..., M is computed by shifting the new frequency components into a W-sample shift register. The oldest M frequency component values in the shift register are shifted out of the register by this input operation. Denote the component contents of the shift register by $G_k$, for k=0, ..., W−1. Controller 358 then computes a weighted sum of the contents of the shift register to generate each of the M time domain samples, i.e., $$X_i = \sum_{k=0}^{W-1} {}^iA_k * G_k \qquad (2)$$

Each set of weights may be viewed as a W component vector which forms one row of an M×W matrix. To simplify the following discussion, vector notation will be used to designate the weights and the transformation matrices. Vectors and matrices will be shown in bold print. For example the weight set $^iA_j$ for j=0 to W−1 will be denoted by the vector $^iA$. The methods by which the coefficient vectors $^iA$ are generated for a particular filter band characteristic are known to those skilled in the art. In particular, the reader is referred *Signal Processing with Lapped Transforms*, H, Malvar, Artech House, 1992. This publication provides examples of genus 2 and 4 transforms as well as detailing the methods for constructing transforms of arbitrary genus and M values. For the purposes of the present discussion, it is sufficient to note that the coefficient vectors are real numbers. However, it will be apparent to those skilled in the art that complex valued coefficient vectors may also be employed.

It should be noted that other perfect reconstruction filter banks are possible. For example, filter banks in which the analysis filter differs from the synthesis filter are known to the prior art. Perfect reconstruction filter banks based on bi-orthogonal filter banks are known to the prior art for the case in which the genus is 1.

Refer again to FIG. 1. If communication link 113 did not alter the signals transmitted thereon by introducing phase shifts into the underlying frequency components, these filter banks could be advantageously used to construct the transformations between the frequency and time domains in a multi-carrier transceiver such as that described with reference to FIG. 1. As noted above, the symbols stored in register 104 are real numbers which represent the amplitude of a signal in each of M frequency bands. To completely specify the signal, both the amplitude and phase of each frequency component must be given. Hence, the phases of the frequency components are assumed to be zero. Consider the case in which the communication link 113 introduces a phase shift of 90 degrees into one of the frequency components. Since the coefficient vectors $^iA$ are real, the time-domain to frequency-domain transform filter bank only measures the real part of each frequency component underlying the time-domain sample sequence. Since a real frequency component that undergoes a 90 degree phase shift has no real part, the resultant frequency component would be zero. It should be clear from this simple example that the analysis filter bank 120 must be capable of measuring both the amplitude and phase of the underlying frequency components. It should be noted that even in the cases in which the real part of the phase shifted frequency component is not zero, a measurement based on both the real and imaginary parts of the amplitude will be more immune to noise than one based solely on the real or imaginary parts. The filter banks described above do not provide the capability of measuring both the real and imaginary parts of the frequency components.

However, an analysis filter bank represented by the matrix C and having the desired property may be constructed from the synthesis filter bank A described above. Filter bank C is a complex filter bank whose elements are given by $$C = A + j\hat{A} \qquad (3)$$

where $j = \sqrt{-1}$, and the matrix $\hat{A}$ is the matrix A time-reversed. That is, $^i\hat{A}_k = {}^iA_{W-k}$, for k=0, ..., W−1. The analysis filter bank 120 performs the following computation to obtain the modified data symbols $S'_i$:

$$S_i = \sum_{k=0}^{W-1} [{}^iA_k + j\hat{A}_k] * X_k \qquad (4)$$

The complex transform C provides both magnitude and phase information; hence, the modified data symbols $S'_i$ will, in general, be complex numbers. If the matrix A is chosen to provide narrow-band filtering of the signal, then C will represent phase information in a manner similar to that of a Fourier transform.

The output of the analysis transform represents the frequency components that were inputted to transmitter 100 after the components have been transformed by the channel itself. In general, each frequency component will have been attenuated and phase shifted. It is assumed that the attenuation and phase shift for each channel is constant over a time period that is large compared to that needed to send the W samples referred to above. Hence, the attenuation and phase shift can be measured and stored periodically for use in correcting the data output by the analysis transform. Let $U_k$ represent the complex data generated by the time-domain to frequency domain transformer 120 when each symbol input to frequency to time-domain transformer 106 has the value 1. $U_k$ is the then a transform domain representation of the channel. In this case, equalizer 124 generates the corrected data symbols $S_k$ by performing the following computation:

$$S_k = Re\left[\frac{S'_k}{U_k}\right] \quad (5)$$

It should be noted that in the absence of noise or changes in the channel attenuation and phase shifts since the last measurement of the $U_k$, $S'_k/U_k$ would be expected to be a real number. Hence, a correction based on either the magnitude of the ratio or the real part of the ratio would be expected to provide the best correction in the presence of noise. It has been found experimentally that Eq. (5) provides a better estimate of $S_k$ than a correction based on the magnitude of the ratio. However, systems based on computing the magnitude of the ratio may function satisfactorily. It will be apparent to those skilled in the art that calibration symbol sets in which each symbol has a value set to some other predetermined value may also be used.

The above described embodiment in which C is given by Eq. (3) is the preferred embodiment of the present invention; however, it will be apparent to those skilled in the art that other forms of transform can be used in place of C. In the more general embodiments of the present invention, the signal values, $X_j$, transmitted on communication link 113 are obtained by transforming the symbols, $S_j$, with a first transformation represented by a matrix A, and then the received signal values, $X'_j$, are converted to the $S'_j$ by applying a transformation represented by the complex matrix B+jB'. Here, A, B, and B' are real valued matrices. The original symbol set is then recovered from the $S'_j$ by applying a correction transformation which depends on the attenuation and phase shift values measured for each channel. In this case, the transformation represented by B' is not necessarily orthogonal to that represented by B. If these transformations are not orthogonal, then the recovery of the attenuated and phase shifted frequency components may require that a set of simultaneous linear equations be solved. Hence, the preferred embodiment of the present invention uses orthogonal transformations.

In practice, the attenuated and phase shifted symbols $S'_j$ are obtained by performing two transformations, one with B and one with B'. The results are then combined to determine $S'_j$. As noted above, if B and B' are not orthogonal, the combining operation will require the solution of a set of linear equations. Once the $S'_j$ are obtained, the originals symbols are recovered via the operation shown in Eq. (5) or a similar correction method.

Various modifications to the present invention will become apparent to those skilled in the art from the foregoing description and accompanying drawings. Accordingly, the present invention is to be limited solely by the scope of the following claims.

What is claimed is:

1. A system for communicating information over a communication link, said system comprising:

means for receiving data symbols specifying said information;

means for converting groups of M said data symbols to a plurality of time-domain samples, said convening means comprising means for storing the last W said data symbols received by said receiving means, where W is an integer multiple of M and M and W are greater than 1, and first correlation means for computing the correlation of said stored symbols with M vectors $^iA$, for i= 1, . . . , M, each said vector having W components;

means for sequentially transmitting said time-domain symbols on said communication link, each said time-domain symbol being transmitted as an analog signal on said communication link;

means for receiving said analog signals from said communication link and for convening said analog signals to digital values;

means for storing the digital values corresponding to the last W said analog signals received; and second correlation means for computing the correlation of said stored digital values with M complex vectors $^iB+j^iB'$, to obtain M modified data symbols $S'_i$, for i=1, . . . , M, wherein $^iB$ and $^iB'$ are real valued, and j= $\sqrt{-1}$.

2. The system of claim 1 wherein $^iB=^iA$ and $^iB'=\hat{A}$, wherein, $^i\hat{A}_k =^iA_{W-k}$ for k=0 . . . W−1.

3. The system of claim 1 further comprising means for correcting said $S'_i$ for attenuation and phase shifts resulting from the transmission of said analog signals on said communication link.

4. The system of claim 3 wherein said correcting means comprises:

means for computing the ratio of $S'_k/U_k$, where $U_k$ is the value of $S'_k$ obtained when all of the data symbols input to said receiving means have a known calibration value.

5. A receiver for use in system for use in system for communication information over a communication link, said receiver decoding a set of M symbols, $S_j$, transmitted on said communication link as a sequence of analog signals obtained by computing the correlation between said symbols and a set of M vectors, $^iA$, for i=1, . . . , M, said receiver comprising:

means for receiving said analog signals from said communication link and for convening said analog signals to digital values;

means for storing the digital values corresponding to the last W said analog signals received, where W is an integer multiple of M and M and W are greater than 1; and correlation means for computing the correlation of said stored digital values with M complex vectors $^iB+j^iB'$, to obtain M modified data symbols $S'_i$, for i=1, . . . , M, wherein $^iB$ and $^iB'$ are real valued, and j=$\sqrt{-1}$.

6. The system of claim 5 wherein $^iB=^iA$ and $^iB'=\hat{A}$, wherein, $^i\hat{A}_k =^iA_{W-k}$ for k=0 . . . W−1.

* * * * *